US012434160B2

(12) United States Patent
Boyle

(10) Patent No.: US 12,434,160 B2
(45) Date of Patent: Oct. 7, 2025

(54) SYSTEM AND METHOD FOR MODULAR RIDE VEHICLES

(71) Applicant: Universal City Studios LLC, Universal City, CA (US)

(72) Inventor: Patrick Devin Boyle, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/207,597

(22) Filed: Jun. 8, 2023

(65) Prior Publication Data

US 2023/0390654 A1 Dec. 7, 2023

Related U.S. Application Data

(63) Continuation of application No. 17/065,849, filed on Oct. 8, 2020, now Pat. No. 11,712,635, which is a
(Continued)

(51) Int. Cl.
*A63G 31/02* (2006.01)
*A63G 31/16* (2006.01)
*G05B 15/02* (2006.01)

(52) U.S. Cl.
CPC .............. *A63G 31/02* (2013.01); *A63G 31/16* (2013.01); *G05B 15/02* (2013.01)

(58) Field of Classification Search
CPC .......... A63G 31/02; A63G 31/16; A63G 7/00; A63G 31/00; G05B 15/02
See application file for complete search history.

(56) References Cited

U.S. PATENT DOCUMENTS 4,543,886 A 10/1985 Spieldiener et al.
4,620,280 A 10/1986 Conklin
(Continued)

FOREIGN PATENT DOCUMENTS

CN 1915470 2/2007
CN 101912689 12/2010
(Continued)

OTHER PUBLICATIONS

PCT/US2015/044421 international Search Report and Written Opinion dated Nov. 12, 2015.
(Continued)

*Primary Examiner* — Nga X Nguyen
(74) *Attorney, Agent, or Firm* — Fletcher Yoder P.C.

(57) ABSTRACT

A system includes a plurality of ride vehicle modules, where each of the plurality of ride vehicle modules includes an interlock system configured to perform linking operations to join to other ride vehicle modules to form a cluster and delinking operations to separate from the other ride vehicle modules throughout a ride, control circuitry configured to control the interlock system and movement of the respective ride vehicle module independently or as a part of the cluster, and communication circuitry configured to wirelessly communicate with the other ride vehicle modules internal and/or external to the cluster. The cluster may change sizes throughout the ride by performing linking and delinking operations as desired. A method for changing the size of clusters of ride vehicle modules throughout a ride is also disclosed.

22 Claims, 12 Drawing Sheets

Related U.S. Application Data continuation of application No. 16/113,761, filed on Aug. 27, 2018, now Pat. No. 10,821,369, which is a continuation of application No. 14/461,141, filed on Aug. 15, 2014, now Pat. No. 10,086,299.

(56) References Cited

U.S. PATENT DOCUMENTS

| | | |
|---|---|---|
| 5,316,480 A | 5/1994 | Ellsworth |
| 5,777,451 A | 7/1998 | Kobayashi et al. |
| 6,463,859 B1 | 10/2002 | Ikezawa et al. |
| 7,484,460 B2 | 2/2009 | Blum et al. |
| 7,815,514 B2 | 10/2010 | Henry et al. |
| 8,079,916 B2 | 12/2011 | Henry |
| 8,132,513 B2 | 3/2012 | Crawford et al. |
| 8,578,857 B2 | 11/2013 | Crawford et al. |
| 9,014,965 B2 | 4/2015 | King et al. |
| 9,434,398 B2 | 9/2016 | Lucisano |
| 9,468,857 B2 | 10/2016 | De-Gol |
| 10,053,138 B2 | 8/2018 | Foster et al. |
| 10,527,428 B1 | 1/2020 | Mehta |
| 10,821,369 B2 | 11/2020 | Boyle |
| 2003/0093178 A1 | 5/2003 | Russell et al. |
| 2005/0048446 A1 | 3/2005 | Fromyer et al. |
| 2009/0320713 A1 | 12/2009 | Amiri |
| 2010/0053029 A1* | 3/2010 | Wilzbach ............ A63G 31/16 345/2.3 |
| 2013/0017893 A1 | 1/2013 | Feuer et al. |
| 2013/0145953 A1* | 6/2013 | Crawford ............ B61J 1/10 104/35 |
| 2014/0129074 A1 | 5/2014 | Boshears et al. |
| 2015/0246290 A1 | 9/2015 | De-Gol |
| 2016/0023121 A1* | 1/2016 | McVeen ............ A63G 7/00 104/84 |

FOREIGN PATENT DOCUMENTS

| | | |
|---|---|---|
| CN | 102112186 | 6/2011 |
| CN | 202006027 | 10/2011 |
| CN | 102728075 | 10/2012 |
| CN | 102749870 | 10/2012 |
| CN | 103212205 | 7/2013 |
| DE | 4243812 | 6/1994 |
| DE | 202010008641 | 12/2010 |
| EP | 2335791 | 6/2011 |
| FR | 2393694 | 1/1979 |
| JP | H024399 | 1/1990 |
| JP | 03-261494 | 11/1991 |
| JP | 06-218146 | 8/1994 |
| JP | 07-108090 | 4/1995 |
| JP | H0857159 | 3/1996 |
| JP | 2008120024 | 5/2008 |
| JP | 2008168135 | 7/2008 |
| JP | 2009131637 | 6/2009 |
| JP | 2011519777 | 7/2011 |
| KR | 20130029700 | 3/2013 |
| KR | 20130029700 A * | 3/2013 |
| WO | 9523636 | 9/1995 |
| WO | 2008067926 | 6/2008 |
| WO | 2006079326 | 8/2009 |
| WO | 2010043508 | 4/2010 |

OTHER PUBLICATIONS

CN 201580056377.1 Office Action dated Jun. 4, 2018.
RU 2017108418 Office Action dated Feb. 6, 2019.
JP 2017-528408 Office Action dated Jun. 24, 2019.
Japan Office Action; JP Application No. 2020-065727; dated Jun. 10, 2021.
JP Office Action for Japanese Application No. 2022-019452 mailed Mar. 27, 2023.
KR 2017-7006926 Office Action dated Apr. 29, 2022.
Screen captures from YouTube video clip entitled "[4K] Trackless Ride—Ratatouille Ride—Disneyland Paris," 2 pages, uploaded on Sep. 20, 2016 by user "Attractions 360°". Retrieved from Internet: <https://www.youtube.com/watch?v=WtZdXqY1TKs>.
Screen captures from YouTube video clip entitled "Walt Disney Studios Paris: Ratatouille (Inaugurazione 2014—Press Event)," 2 pages, uploaded on Jun. 26, 2014 by user "Parksmania.it". Retrieved from Internet: <https://www.youtube.com/watch?v=3eifC5C6ItU>.
JP Office Action for Japanese Application No. 2023-215707 mailed Dec. 26, 2024.

* cited by examiner

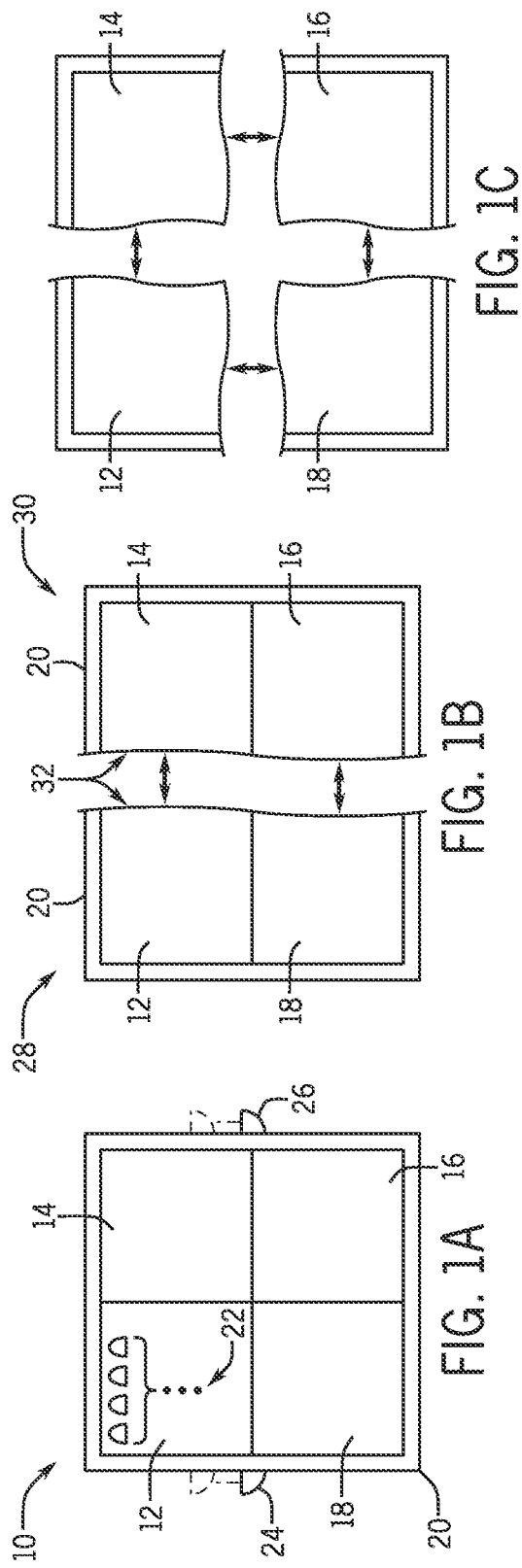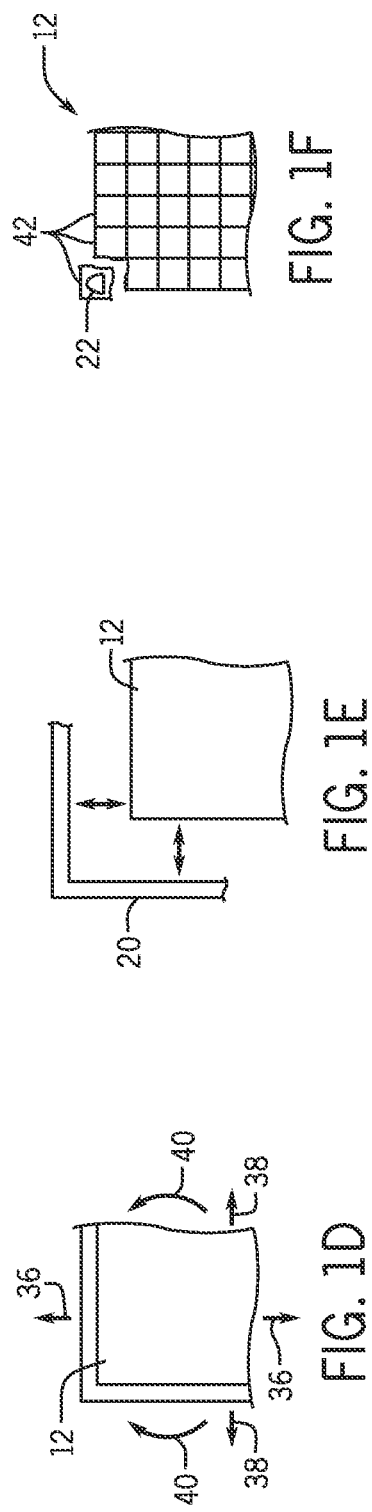

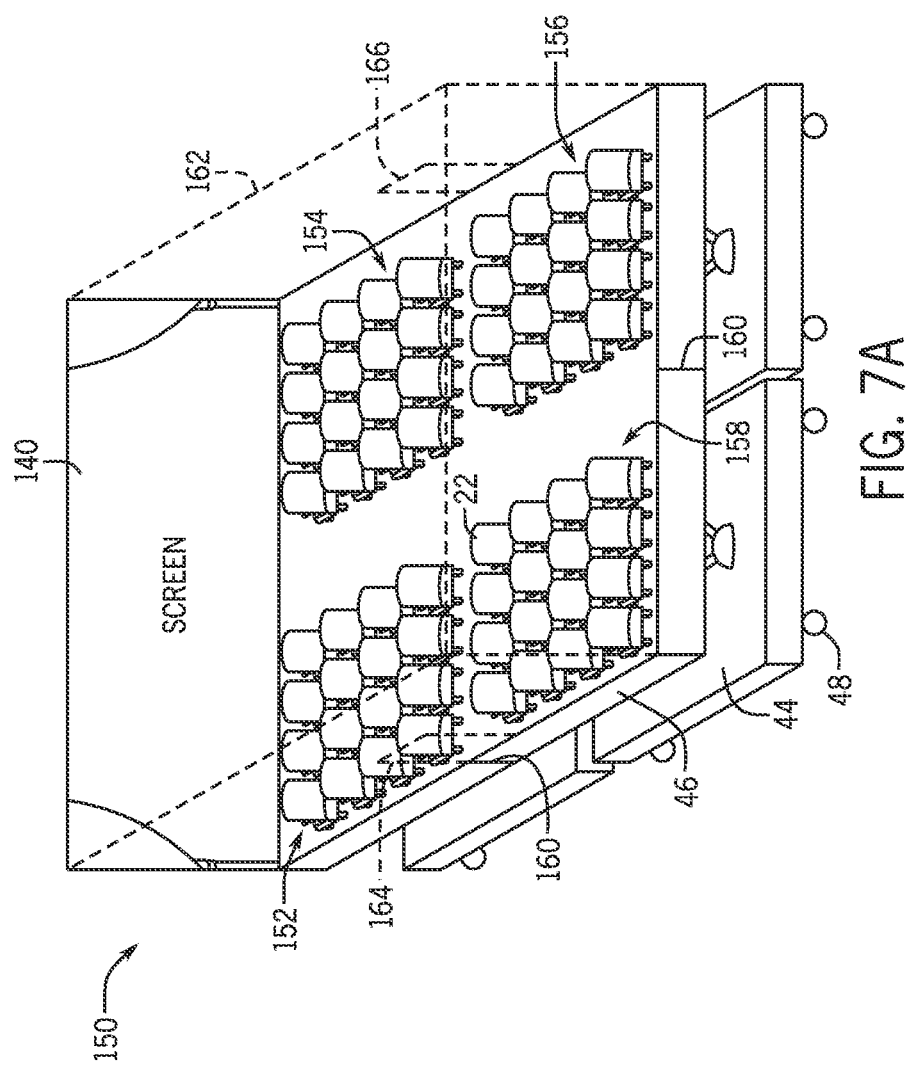

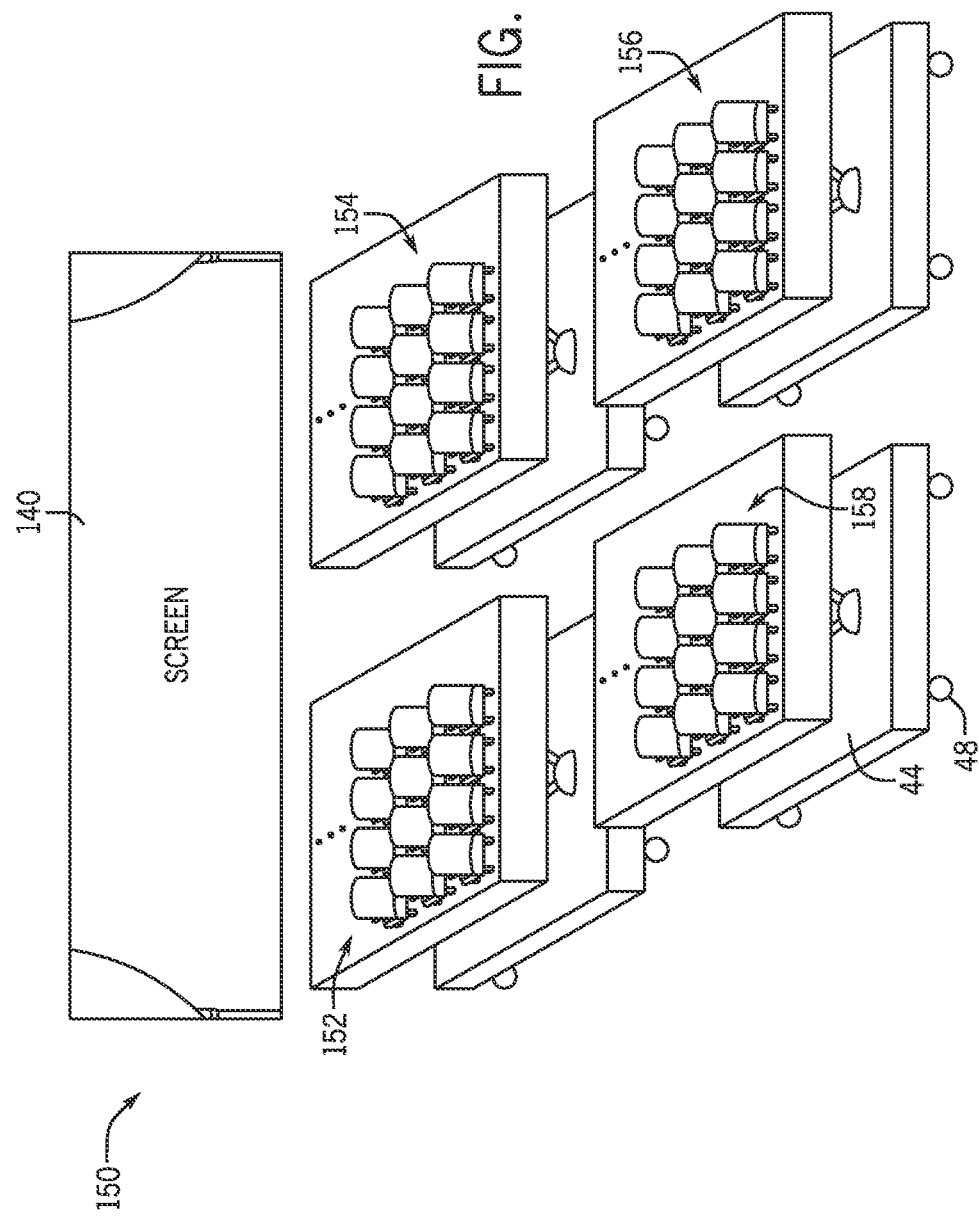

SYSTEM AND METHOD FOR MODULAR RIDE VEHICLES

CROSS-REFERENCE TO RELATED APPLICATIONS

This application is a continuation of U.S. patent application Ser. No. 17/065,849, filed Oct. 8, 2020, entitled "SYSTEM AND METHOD FOR MODULAR RIDE VEHICLES," which is a continuation of U.S. patent application Ser. No. 16/113,761, now U.S. Pat. No. 10,821,369, filed Aug. 27, 2018, entitled "SYSTEM AND METHOD FOR MODULAR RIDE VEHICLES," which is a continuation of U.S. patent application Ser. No. 14/461,141, now U.S. Pat. No. 10,086,299, filed Aug. 15, 2014, entitled "SYSTEM AND METHOD FOR MODULAR RIDE VEHICLES." These applications are hereby incorporated by reference in their entirety for all purposes.

BACKGROUND

Ride vehicles in amusement parks, carnivals, and the like, are generally utilized to securely carry one or more passengers throughout the course of a ride. There are numerous kinds of ride vehicles that are designed for particular kinds of rides. For example, roller coasters include tracks to which the ride vehicles attach and traverse, simulators may entail a ride vehicle being attached to a motion base system and include a simulation display, and water rides may include a ride vehicle with flotation capabilities, to name a few. Typical ride vehicles either include separate and distinct vehicles or integral ride vehicles coupled together (e.g., a train of cars on fixed tracks).

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure a system includes a plurality of ride vehicle modules, where each of the plurality of ride vehicle modules includes an interlock system configured to perform linking operations to join to other ride vehicle modules to form a cluster and delinking operations to separate from the other ride vehicle modules throughout a ride, control circuitry configured to control the interlock system and movement of the respective ride vehicle module independently or as a part of the cluster, and communication circuitry configured to wirelessly communicate with the other ride vehicle modules internal and/or external to the cluster. The cluster is configured to change sizes throughout the ride by performing linking and delinking operations as desired via the control circuitry of each of the plurality of ride vehicle modules controlling its interlock system and via the communication circuitry coordinating the operations between the plurality of ride vehicle modules.

In accordance with another aspect of the present disclosure a system includes a plurality of ride vehicle modules configured to synchronously join to each other in a cluster via any interlock system installed on one or more sides of each modular ride vehicle. The plurality of ride vehicle modules in the cluster is configured to move in unison as one uniform ride vehicle via onboard control and communication circuitry, and to change sizes by linking other ride vehicle modules or delinking from previously joined ride vehicle modules throughout a ride.

In accordance with another aspect of the present disclosure a method includes determining, via control circuitry, the desired size of one or more clusters of ride vehicle modules throughout a ride, setting, via control circuitry and communication circuitry, the size of the one or more clusters, and performing, via control circuitry configured to control an interlock system installed on each of the ride vehicle modules and communication circuitry configured to communicate between the ride vehicle modules, linking and delinking operations via the interlock systems based on the set size of the one or more clusters throughout the ride.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1A-1F include a set of schematic diagrams of embodiments of a uniform ride vehicle that may separate into numerous smaller ride vehicle modules, in accordance with the present disclosure;

FIGS. 7A and 7B include perspective views of an embodiment of a movie theater ride vehicle and its delinking features in accordance with the present disclosure;

DETAILED DESCRIPTION

Figure 2:
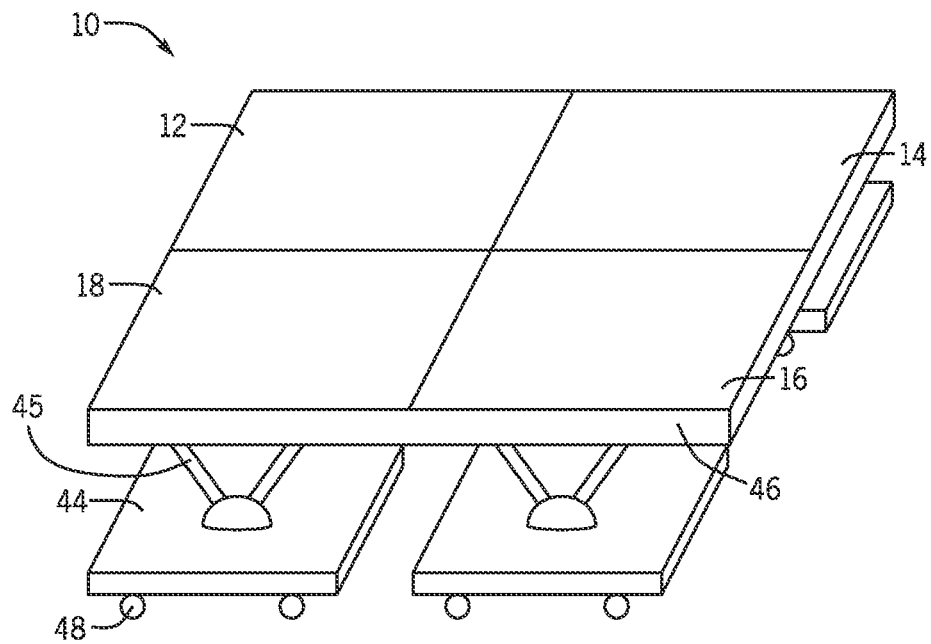
FIG. 2 is a perspective view of an embodiment of numerous ride vehicle modules linked and operating as a uniform ride vehicle, in accordance with the present disclosure.

Presently disclosed embodiments are directed to systems and methods for configuring cluster sizes of a plurality of ride vehicle modules by performing linking and delinking operations during the course of a ride. The clustered ride vehicle modules may form a unified vehicle that can be rearranged into various modular subsets (e.g., intermediate vehicles) to achieve desired ride effects (e.g., the illusion of a single vehicle being broken into parts in stages). In particular, presently disclosed embodiments are directed to systems and methods of physically and/or virtually linking and delinking ride vehicle modules. The modularity of the ride vehicles may refer to their composition of separate units, which will be described in detail below, for flexible arrangement and configuration in various sized clusters, herein. The modular ride vehicles may travel either synchronously or asynchronously in the various sized clusters or as individual unit modules. At the start of a ride, the ride vehicle modules may be essentially seamlessly linked by an interlock system in a way that they appear as one uniform ride vehicle. In other words, patrons may get the impression that they are entering one completely integral and unified ride vehicle, when in fact it is a cluster of a plurality of ride vehicle modules linked together. Indeed, based on the way the ride vehicle modules are linked, the patrons may not even realize that the uniform ride vehicle is enabled to separate into smaller clusters of ride vehicle modules.

Further, in some embodiments, when the ride vehicle modules are physically joined together in a cluster, they may also be electronically and communicatively coupled. That is, ride vehicle circuitry (e.g., control and communication circuitry) may enable joined ride vehicle modules to perform actions in unison as a single uniform ride vehicle. In some embodiments, each individual ride vehicle module may be connected to a motion base system that enables performing actions in unison with other ride vehicle modules in a cluster, as instructed. Additionally, when a ride vehicle module is delinked from a cluster, it may operate or perform actions independently by utilizing its control circuitry (e.g., processor) to control its attached motion base system. For example, each ride vehicle module may include an automation controller (e.g., a programmable logic controller) and this controller may coordinate with other controllers of other ride vehicle modules (e.g., designating a primary controller and subservient secondary controllers) when the vehicle modules are clustered to achieve unified motion of the whole cluster or unified modular ride vehicle. It should be noted that the ride vehicle modules may refer to automated guided vehicles (AGV), which may be defined as mobile vehicles enabled to follow predetermined paths, move with six degrees of freedom (e.g., roll, pitch, yaw, surge, heave, and sway), and link to and delink from other similar AGVs, herein.

To illustrate, in a certain embodiment, the patrons may enter a modular airplane ride vehicle, which may appear to be one large unified ride vehicle simulator. When the airplane takes off in its simulation, the control and communication circuitry may instruct the ride vehicle modules at the front of the uniform airplane ride vehicle to pitch up and the ride vehicle modules at the back of the uniform airplane ride vehicle to pitch down. However, during the course of flight simulation, the plane may simulate a crash by breaking apart the plurality of ride vehicle modules, for example, splitting across the middle of the airplane. Thereafter, the front half of the airplane ride vehicle (e.g., a first subset of vehicle modules of the initial modular assembly) may turn and begin moving down one path in the ride, while the back half of the airplane ride vehicle (e.g., a second subset of the vehicle modules of the initial modular assembly) may turn and begin moving down another path in the ride. Each half or intermediate cluster (the respective cluster of vehicle modules) of the airplane ride vehicle may act as a uniform ride vehicle in unison under the control of respective processors (e.g., processors of automation controllers) in communication with one another. Also, each path may provide a different story and/or movements so a patron may obtain numerous different experiences during subsequent rides.

Further down the ride, either or both halves of the initial cluster, which in this example was a complete airplane, may experience an event that causes another delinking of ride vehicle modules into smaller intermediate clusters. The ride vehicle cluster size may continue to shrink in size until desired. Indeed, the breaking apart may continue until all ride vehicle modules are separated so individual patrons or subsets of patrons are experiencing a portion of the ride alone. Then, as the ride approaches the end, or the patrons have exited their ride vehicle module, the ride vehicle modules may reconnect by performing linking operations to reestablish the initial cluster. This may enable preparing the initial airplane ride vehicle for the next group of patrons that wish to experience the ride. It should be noted that the airplane was used as an example ride vehicle and not meant to limit this disclosure. As may be appreciated, seamlessly joined ride vehicles modules that appear as a single ride vehicle, which are further enabled to unexpectedly split apart, may enhance a patrons experience by providing surprise and more than one experience depending on where the patron is initially sitting.

Turning first to FIG. 1A-1F, a set of schematic diagrams is shown of embodiments of a uniform ride vehicle that may separate into numerous smaller ride vehicle modules. Beginning with FIG. 1A, a uniform ride vehicle 10 is described that may include four individual ride vehicle modules 12, 14, 16, and 18 and a barrier (e.g., wall and/or ceiling) 20. Each of the four individual ride vehicle modules 12, 14, 16, and 18 may include a plurality of seats 22. The barrier 20 may include one or more entrance ways 24 to and one or more exit ways 26 from the uniform ride vehicle 10. It should be noted that although four individual ride vehicle modules are shown, the present disclosure enables any number of ride vehicle modules being linked to form a uniform ride vehicle 10. Indeed, in some embodiments, each individual seat 22 is a part of its own individual ride vehicle module. Thus, if a uniform ride vehicle 10 includes twenty-five seats, it may include twenty-five individual ride vehicle modules, and so forth.

As illustrated, the individual ride vehicle modules 12, 14, 16, and 18 may be linked together and surrounded by the barrier 20 to appear as one uniform ride vehicle 10, instead of four separate ride vehicle modules. The individual ride vehicle modules may be four sided and may link with one another on any of the four sides. That is, the ride vehicle modules may link front-to-back and/or side-to-side with other ride vehicle modules. As described in detail below, the ride vehicle modules may link together in a number of ways utilizing an interlock system. In addition, the ride vehicle modules may include on-board simulators, motion base systems, a traction system (e.g., tires, treads, etc.) for driving and/or connecting to a track, floatation capabilities (e.g., raft), a driving system for driving and/or propelling the ride vehicle module, a navigation system, a suspension system, ride vehicle circuitry for controlling the ride vehicle module and communicating with other ride vehicle modules, among others.

In some embodiments, the uniform ride vehicle 10 may be an airplane and the ride vehicles modules 12, 14, 16, and 18 may be different sections of the airplane separated by walkways that disguise the connections between the ride vehicles. In another embodiment, the uniform ride vehicle 10 may represent a movie theater, and the ride vehicles modules 12, 14, 16, and 18 may be different sections of the theater separated by walkways that disguise the connections between the ride vehicle modules. In any embodiment, the disclosed techniques enable arranging a plurality of individual ride vehicle modules together into a uniform ride vehicle 10 that appears as though it is one integrated vehicle. Also, as described in detail below, in certain embodiments, the ride vehicle modules may be connected to motion base systems that are controlled by control circuitry and communication circuitry included in the ride vehicle modules. As such, the motion base systems may be controlled together to move (e.g., pitch, roll, vibrate, surge, heave, and sway) the uniform ride vehicle 10, which is made up of ride vehicle modules, as one integrated unit.

During the course of the ride, the uniform ride vehicle 10 may be triggered to split apart (e.g., perform delinking operations) by computer instructions stored on a non-transitory machine-readable medium (e.g., memory), received signals from a control system located remotely from the ride vehicle, fixed tracks, or the like. In some embodiments, the trigger may be in response to an event occurring in the ride such as a simulated crash, explosion, natural disaster, dinosaur/animal attack, and so forth. As a result, FIG. 1B describes an embodiment of the uniform ride vehicle 10 performing delinking operations to split (e.g. the jagged lines 32 represent the vertical splitting apart) into two different intermediate uniform ride vehicles 28 and 30. As depicted, the intermediate uniform ride vehicles were split vertically, however, since the ride vehicle modules are enabled to link on any of their four sides, the split may be performed horizontally, as well. It should be noted that the barrier 20 surrounding the ride vehicle modules 12, 14, 16, and 18 may utilize the techniques described herein to break apart in a manner similar to the ride vehicle modules. In some embodiments, a containment system may be utilized to restrain patrons physically so that they are separated from any breakaway zones. Further, the breakaway zones may be spaced far enough away from the patrons' seats to avoid obstructions when linking.

The intermediate uniform ride vehicles 28 and 30 each represent a cluster of two individual ride vehicle modules. Specifically, the intermediate uniform ride vehicle 28 includes ride vehicle modules 12 and 18, and the intermediate uniform ride vehicle 30 includes ride vehicle modules 14 and 16. Accordingly, the intermediate uniform ride vehicle 28 may function as a single integrated ride vehicle by operating ride vehicle modules 12 and 18 in unison via utilization of their control circuitry and communication circuitry. The same may be true for the intermediate uniform ride vehicle 30 and its linked ride vehicle modules 14 and 16.

As previously mentioned, the ride vehicle modules may perform linking and delinking operations on all four of their sides. It may be desirable to utilize this capability as a ride progresses to further reduce the cluster size(s) of the ride vehicle modules when certain events occur. To help illustrate, FIG. 1C describes the uniform ride vehicle 10 from FIG. 1A delinking each individual ride vehicle module 12, 14, 16, and 18 on two of their four sides. As may be seen, each individual ride vehicle module 12, 14, 16, and 18 is unfettered from the other ride vehicle modules and may continue on its own path, experiencing a totally different story and/or movements, which will be described in more detail below.

Accordingly, each individual ride vehicle module 12, 14, 16, and 18 may be enabled to move independently. For example, FIG. 1D describes the ride vehicle module 12 delinked from a uniform ride vehicle that is enabled to move forward and backward (arrows 36), side to side (arrows 38), and turn right or left (arrows 40). It should be understood that any uniform ride vehicles including a plurality of ride vehicle modules (e.g., 10, 28, and 30) may also be enabled to move in any direction as an integrated unit.

Further, the barrier (e.g., walls and/or ceiling) 20 that may be connected to and surrounding the ride vehicle modules may be removed as the ride progresses. As depicted in FIG. 1E, a portion of the barrier 20 may be separated from the ride vehicle module 12. Removing the barrier 20 may be desirable depending on the type of ride. For example, in a ride where simulated dinosaurs attack a crashed plane and rip part of the wall or ceiling off, having barriers (e.g., walls and/or ceilings) 20 or portions thereof that disconnect from each other and detach from their respective vehicle modules may be beneficial. Indeed, barriers 20 that may be removed may further enhance patrons' experiences and excitement levels during the ride.

In some embodiments, the ceiling may be physically removed by a robot (e.g. a robot decorated to look like a dinosaur, giant, etc.) located within the ride, and the side wall of the ride vehicle may immediately retract underneath the ride vehicle. Alternatively, the side wall may also be removed by a robot. Additionally, in some embodiments, there may be a transparent wall (e.g., acrylic glass) that remains in place after the wall is removed to avoid obstructions when reconnecting the wall and/or containing any loose objects within the ride vehicle. In other embodiments, a containment system may be utilized to physically restrain patrons so that they are separated from any breakaway zones. This may include using at least locking lap bars, overhead locking chest bars, seat belts, or any combination thereof.

As depicted in FIG. 1F, in some embodiments, the ride vehicle module 12 may be an intermediate uniform ride vehicle and include a plurality of seats 22, which may be attached to their own individual ride vehicle modules 42. Thus, during the course of a ride the intermediate uniform ride vehicle 12 may perform delinking operations to break apart as many times as desired until every single seat 22 and its ride vehicle module 42 are operating independently. For example, a patron may end the ride floating in a canoe (e.g., a cover that the ride vehicle module 42 links with during a portion of the ride) down a river alone. Thus, the ride vehicle modules may be moving asynchronously in different parts of the ride. Indeed, in certain paths of the ride the ride vehicle modules may be delinking in response to certain events, terrain, storylines, and so forth, and moving asynchronously, and in other paths the ride vehicle modules may be moving synchronously and reconnecting in response to certain events, terrain, storylines, and so forth. Further, in some embodiments, completely separate ride components may link with the ride vehicle modules. For example, during a dark part of the ride, the ride vehicle module 42 may link with a component that makes the ride vehicle module 42 change physical appearance (e.g., change from what appears to be an airplane fragment to a canoe). As a result of the disclosed linking operations and modular aspect of the ride vehicles, multiple different experiences may be provided in one ride, thereby encouraging patrons to re-ride the attraction again.

To further illustrate aspects of the disclosure, FIG. 2 includes a perspective view of an embodiment of numerous ride vehicle modules 12, 14, 16, and 18 linked and operating as a single uniform ride vehicle 10. As previously mentioned, the ride vehicle modules may be linked together physically and/or virtually. The physical link may be enabled by an interlock system, described below, or the like. The ride vehicle modules may be virtually linked through onboard ride vehicle circuitry (e.g., communication, control, and/or sensor circuitry) that enables the ride vehicle modules to act in unison as the uniform ride vehicle 10. That is, the ride vehicle modules may coordinate movements to perform actions as a single integrated unit. Indeed, the uniform ride vehicle 10 may keep itself flat when pitching, rolling, and the like, by coordinating the movement of each linked ride vehicle module accordingly. For example, if the ride requires the uniform ride vehicle 10 to roll right, the ride vehicle modules on the right side of the uniform ride vehicle 10 may tilt down and the ride vehicle modules on the left side of the uniform ride vehicle 10 may tilt up. The result may be the left edge of the uniform ride vehicle 10 being at the highest point and the rest of the uniform ride vehicle 10 sloping downward as a unified platform to the lowest point on the right edge.

The integrated movement of the uniform ride vehicle 10 may be enabled by the motion base systems 44 and a suspension system 45 attached to each of the linked ride vehicle modules' platforms 46. The motion base systems 44 may be controlled through ride vehicle circuitry included in each ride vehicle module, which will be described in detail below. The ride vehicle circuitry may include computer instructions stored on a tangible, non-transitory machine-readable medium (e.g., memory, storage) that are executed by control circuitry (e.g., processors) to direct the ride vehicles to move as desired. Alternatively, the ride vehicle circuitry may receive commands or instructions from a remote source, such as a control system located externally from the ride vehicle, to direct the ride vehicles to move as desired. For example, the ride vehicle modules 12, 14, 16, and 18 may communicate with each other so that the right ride vehicle modules' motion base systems 44 and suspension systems 45 angle their attached platforms 46 downward while the left ride vehicle modules' motion base systems 44 and suspension systems 45 simultaneously angle their attached platforms 46 upward to simulate physical affects associated with a right turn at high speed.

Further, each ride vehicle module may include an onboard simulator (not shown) that provides visual display and audio. The motion base systems 44 may be synchronized with the visual display and audio signals to provide patrons with an immersive, seamless, and realistic experience. When the ride vehicle modules are linked as a uniform ride vehicle 10, the visual display and audio signals of each ride vehicle module may be synchronized so that the experience provided is integrated. Additionally, the suspension system 45 may be adaptive to react to the simulators movements in order to provide a unified experience. For example, the suspension system 45 may utilize damping fluid in shock absorbers that may be controlled by exciting fluids with a magnet. The magnets may be programmed to react in time with the simulator to alter the suspension at desired times. Also, the motion base systems 44 may include a traction system (e.g., tires, treads) 48 that enable driving, connecting to a track, and/or the like. The motion base systems 44 may enhance movement characteristics, such as velocity and acceleration, when the ride vehicle module is driven.

In another embodiment, the ride vehicle modules may not be attached to motion base systems or include onboard simulators. Instead, these ride vehicle modules may be moved on and off various motion base systems and simulators located throughout a ride. It should be noted that the ride vehicle modules that do not include motion base systems may still perform linking operations and be enabled to configure cluster size throughout the course of the ride. Indeed, this embodiment of ride vehicle module may also include ride vehicle circuitry configured to uniformly or independently control the ride vehicle modules and communicate with other ride vehicle modules, systems, and the like.

Since the uniform ride vehicles and/or ride vehicle modules may operate without a fixed track, a navigation system may be utilized to guide their movements by tracking their position and making adjustments as needed. There are several embodiments of navigation systems that may be utilized to track the ride vehicle modules paths, including gyroscopic, wire-guided, and/or laser-guided navigation. Gyroscopic navigation may track the position of the ride vehicle modules by counting the number of revolutions its wheels complete. A benefit of using gyroscopic navigation is that it enables a programmer to program the ride vehicle modules' path easily to meet future course changes due to the lack of a fixed track and landmarks needed to determine its location. Also, vision guidance may be utilized that includes stereo cameras along the ride vehicle modules that monitor the objects surrounding them and builds a virtual three-dimensional space to reference its position and control its movement accordingly.

Additionally or alternatively, the wire-guided system can provide position references of the ride vehicle modules along their path, or the laser-guided system may reflect lasers off of reflective tape placed along the path to reference the ride vehicle modules' position. In any embodiment, there may be a plurality of sensors utilized to pass positional data back to control circuitry included in each of the ride vehicle modules. For example, the laser-guided system may include a turret attached to the ride vehicle module that emits lasers in different directions at various objects and the ride vehicle circuitry may determine its location based on the distance measured from those objects. This may provide the benefit of the ride vehicle modules knowing the distance between one another in order to synchronize movements to perform linking operations.

As previously mentioned, in some embodiments, the ride vehicle modules 12, 14, 16, and 18 may be driven around the trackless course. Thus, each ride vehicle module may include a drive system. There are several different embodiments of the drive system that may be utilized, including electric or hydraulic. In one embodiment, the electric drive system may utilize a number of motors to drive the ride vehicle module, and the motors may be asynchronous or synchronous. In another embodiment, the hydraulic system may be utilized that includes a liquid based system. A benefit of using a hydraulic system is that it is self-lubricating and maintenance costs may be lower than using other types of drive systems. As mentioned above, when the ride vehicle modules split apart, they may be enabled to drive and move (e.g., drive, pitch, roll, turn) independently due to their individually attached motion base systems 44, navigation system, ride vehicle circuitry, drive system, and traction system 48.

Further, in some embodiments, in order to power the ride vehicle module and any onboard components, such as ride vehicle circuitry, a simulator's audio and video display, and so forth, the ride vehicle module may include an onboard rechargeable battery. In one embodiment, the ride vehicle modules may include conductive receptors mounted on the bottom of the vehicles that may connect to inductive ground plates installed throughout the ride to recharge. In an alternative embodiment, a wireless recharge system may be utilized that includes a primary coil in a charge pad installed on the ground and a secondary coil in a receptor attached to the ride vehicle modules. The charge pad may transmit electricity to the receptor when the charge pad and receptor are aligned to charge the battery.

Figure 3:
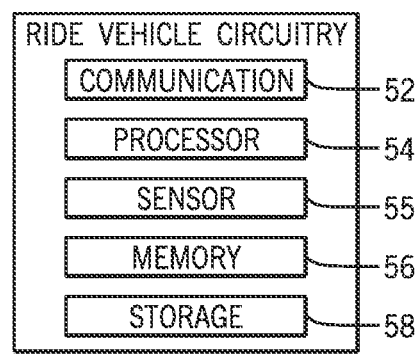
FIG. 3 is a block diagram of ride vehicle circuitry, in accordance with the present disclosure.

Keeping this in mind, FIG. 3 illustrates a block diagram of various components that may be part of the ride vehicle circuitry 50 of each ride vehicle module and may be used to perform linking operations and to integrate movements and/or simulations between ride vehicle modules, among other things. As shown, the ride vehicle circuitry 50 may include communication circuitry 52, a processor 54 (e.g., control circuitry), sensors 55, a memory 56, a storage 58, and the like. The communication circuitry 52 may be a wireless or wired communication component that may facilitate communication between the ride vehicle modules and other systems (e.g., control systems) and/or devices. The communication circuitry 52 may meet industry standards, such as IEEE 802.11b/g. For example, when a uniform ride vehicle separates into different intermediate clusters, the communication circuitry 52 may enable the ride vehicle modules included in the intermediate clusters to coordinate linking operations to reform as the uniform ride vehicle. Also, when the ride vehicle modules are linked as a uniform ride vehicle, the communication circuitry 52 may enable operating as an integrated unit. The processor 54 may be any type of computer processor or microprocessor capable of executing computer-executable code. In some embodiments, the processor 54 may be one or more microcontrollers.

In addition, there are several embodiments for the processor 54 architecture. For example, in one embodiment, one central processor 54 may directly process all data from the communication circuitry 52, the sensors 55, and so forth. In another embodiment, there may be a plurality of subsystems that each have a processor 54 that feeds data to a central processor 54 for more complex decisions. For example, the navigation system may include a processor 54, the communication circuitry 52 may include a processor 54, the sensors 55 may include a processor 54, and so forth, that feeds data to a central processor 54. Utilizing a plurality of processors 54 may enable redundancies. To coordinate movements between linked ride vehicle modules, in one embodiment, one linked ride vehicle module may be designated as the master controller and the other linked ride vehicle modules may be designated as slaves. In this embodiment, the master's processor 54 may relay information related to the control of the entire cluster to the slaves via the communication circuitry 52, and the slaves' processors 54 may determine how to react relative to their position in the cluster to move in unison.

As discussed above, the sensors 55 may enable determining where the ride vehicle module is positioned in the ride and how to synchronously move and connect with other ride vehicle modules, among other things. The memory 56 and the storage 58 may be any suitable articles of manufacture that can serve as media to store processor-executable code, data, or the like. These articles of manufacture may represent tangible, computer-readable media (i.e., any suitable form of tangible memory or storage) that may store the processor-executable code used by the processor 54 to perform the presently disclosed techniques. The memory 56 and the storage 58 may also be used to store video and audio data.

Turning now to FIGS. 4A-4D, which include a set of perspective views of embodiments of concealing the connection line between ride vehicle modules, in accordance with the present disclosure. Generally, the connection line between linked ride vehicle modules may be hidden through the use of patterns, indentations, lighting/shadowing, overlapping materials (e.g., carpet), and so forth, on the surface of the ride vehicle modules' platforms. Concealing the connection line between the ride vehicle modules enhances the appearance that the linked ride vehicle modules are a single uniform ride vehicle. The techniques described below may apply when the ride vehicle modules are linked side-by-side and/or front-to-back.

Figure 4A:
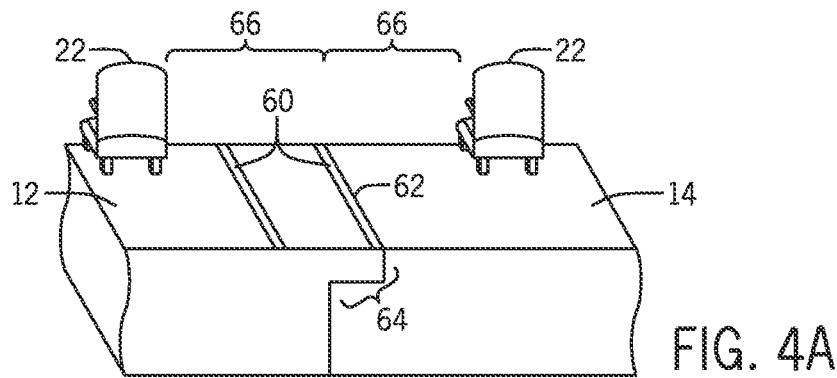
FIGS. 4A-4D include a set of perspective views of embodiments of concealing the connection between ride vehicle modules, in accordance with the present disclosure.

With the foregoing in mind, FIG. 4A depicts ride vehicle modules 12 and 14 linked side-by-side. In some embodiments, a ride vehicle module's platform surface may include lines 60, which may be rails of track lighting that create a walkway. As may be appreciated, such a walkway may resemble those typically seen in airplanes and/or movie theaters. In other embodiments, the lines 60 may be indented grooves in the platform that may be darkened (e.g., with paint, shadows), deep, and so forth. As depicted, the connection line 62 between ride vehicle modules 12 and 14 is immediately adjacent to lines 60 so the crack where the two platforms meet may appear to be integrated with the installation of the track lighting or just another indented groove. The track lighting may be utilized to cast a shadow over the connection line 62 for additional disguise. Further, the sides of the platforms may be designed to be wedged 64. The wedged platforms may fit together in a way that prevents light from emanating from the bottom of the ride vehicle modules and exposing the connection line 62, among other things. Also, as discussed above, the distance between the seats 22 and the connection line 62 (e.g., breakaway point) may be a sufficient distance 66 to prevent any obstructions when linking (e.g., connecting) the ride vehicle modules together during the course of the ride.

Figure 4B:
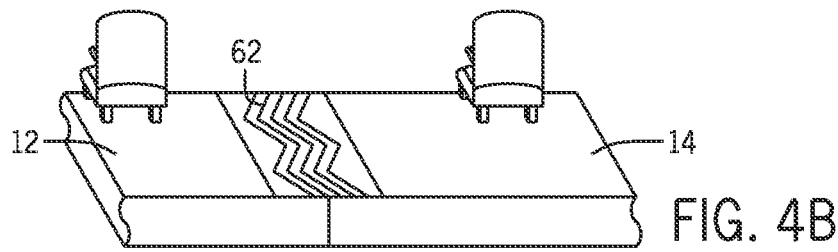

In another embodiment, FIG. 4B depicts concealing the connection line 62 between the side-by-side linked ride vehicle modules 12 and 14 by utilizing a zig-zag pattern. The pattern may be a part of carpet installed on the surface of the ride vehicle modules' platforms, painted on the surface of the ride vehicle modules' platforms, indented as grooves on the surface of the ride vehicle modules' platforms, or the like. The pattern may cover the entire platform surface or only a portion of it. The carpet or paint may use dark colors (e.g., black, gray) in order to mask the connection line 62. Additionally, if the zig-zags are indented grooves, the grooves may also be darkened with paint and/or shadowing. The sides of the platforms may be designed to be zig-zagged so the corresponding teeth may interlock when linked together.

Figure 4C:
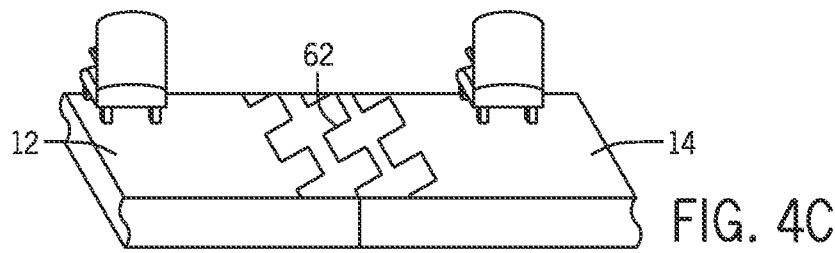

In another embodiment, FIG. 4C depicts concealing the connection line 62 between the side-by-side linked ride vehicle modules 12 and 14 by utilizing an interlocking square pattern. The pattern may be a part of carpet installed on the surface of the ride vehicle modules' platforms, painted on the surface of the ride vehicle modules' platforms, indented as grooves on the surface of the ride vehicle modules' platforms, or the like. The pattern may cover the entire platform surface or only a portion of it. The carpet or paint may use dark colors (e.g., black, gray) in order to mask the connection line 62. Additionally, if the interlocking squares are indented grooves, the grooves may also be darkened with paint and/or shadowing. The sides of the platforms may be designed to be interlocking squares so the corresponding teeth fit together when linked.

In yet another embodiment, the platform surface of one of the ride vehicle modules may include a flap that extends onto a connected ride vehicle module in order to cover the connection line 62 completely. This flap may be made of carpet, rubber, and the like. It may include a pattern that blends in with a pattern included across the surfaces of the linked ride vehicle modules' platforms so that the platforms appear to be unified.

Figure 4D:
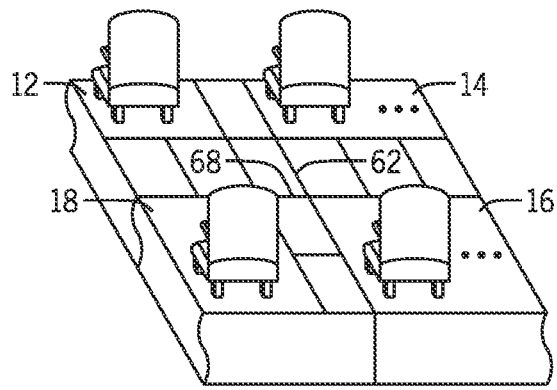

FIG. 4D depicts ride vehicle modules 12, 14, 16, and 18 that are linked together side-to-side and front-to-back. In this embodiment, the side-to-side connection line 62 and the front-to-back connection line 68 is hidden as part of a checkered pattern. As described above, the checkered pattern may be a part of carpet installed on the surface of the ride vehicle modules' platforms, painted on the surface of the ride vehicle modules' platforms, indented as grooves on the surface of the ride vehicle modules' platforms, or the like. The carpet or paint may use dark colors (e.g., black, gray) in order to mask the connection line 62 as a border. Additionally, if the lines that make up the checkered pattern are indented grooves, the grooves may also be darkened with paint and/or shadowing. This may aid in disguising the connection lines 62 and 68 as part of the pattern so a patron gets the impression that the assembled ride vehicle modules 12, 14, 16, and 18 are actually one uniform and completely integral ride vehicle.

Now turning to how the ride vehicle modules physically link together, FIGS. 5A-5M include a set of perspective views of embodiments of the interlock system that may be utilized by the ride vehicle modules to perform linking operations, in accordance with the present disclosure. The disclosed embodiments of the interlock system may be installed on the sides, front, and/or back of each of the ride vehicle modules. In some embodiments, the interlock system may be controlled by the ride vehicle circuitry 50 included on the ride vehicle module. For example, the ride vehicle circuitry 50 may receive feedback when the ride vehicle modules are fully locked into place. The feedback may be obtained via sensors (e.g., proximity sensors) installed on the sides, front, and/or back of the ride vehicles. Using this information, the ride vehicle circuitry 50 may communicate with the locked ride vehicle modules to act as a uniform ride vehicle. Likewise, the ride vehicle circuitry 50 may receive feedback (e.g., via sensors) when the ride vehicle modules are delinked. Using this information, the ride vehicle circuitry 50 may continue to operate the ride vehicle module in unison with any remaining connected ride vehicle modules, or if the ride vehicle module is by itself, to operate the ride vehicle module independently. Further, the interlock system enables the ride vehicle modules functioning as an integrated unit by rigidly and solidly locking them together.

Figure 5A:
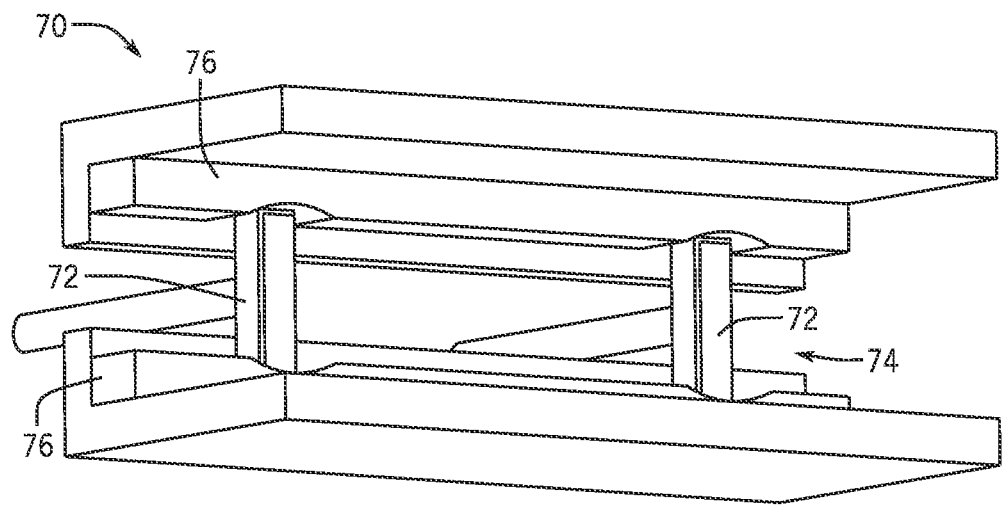
FIGS. 5A-5H include a set of perspective views of embodiments of an interlock system utilized during the linking operations, in accordance with the present disclosure.

FIG. 5A illustrates an embodiment of an interlock system including a T-screw rail lock 70. The T-screws 72 may be installed on a first ride vehicle and retracted parallel to the floor until needed. When triggered or directed to connect to an approaching ride vehicle module by the ride vehicle circuitry 50, the T-screws 72 may extended to fit through a rail 74 in the approaching ride vehicle module and rotate to lock, as shown. The first ride vehicle module may then retract the T-screws 72 to bring the connected vehicle modules together as close as possible. The T-screws rail lock 70 may include thick rubber pads 76 that resist the turning of the T-screws 72 and provide a strong hold inside of the rail 74 to manage alignment, among other things. The T-screws 72 may be rotated again when directed to delink from a connected ride vehicle module and the T-screws 72 may retract to their original position. This may enable a quick disconnection between ride vehicle modules. It should be noted that each ride vehicle module may include the T-screws 72 and/or the rail 74 installed in any combination in its sides, front, and/or back to enhance modularity.

Figure 5B:
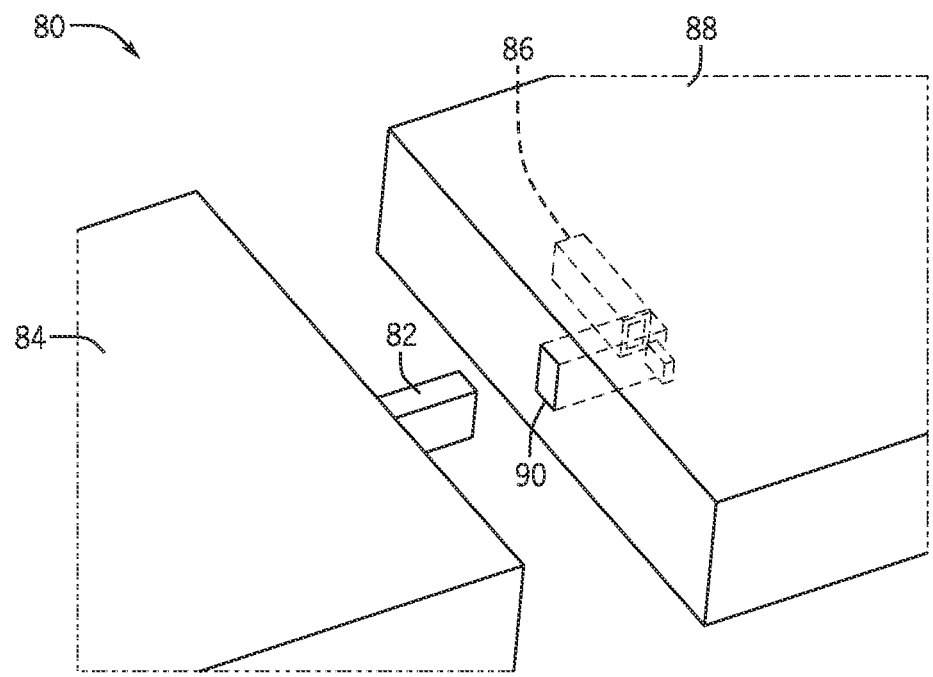
Figure 5C:
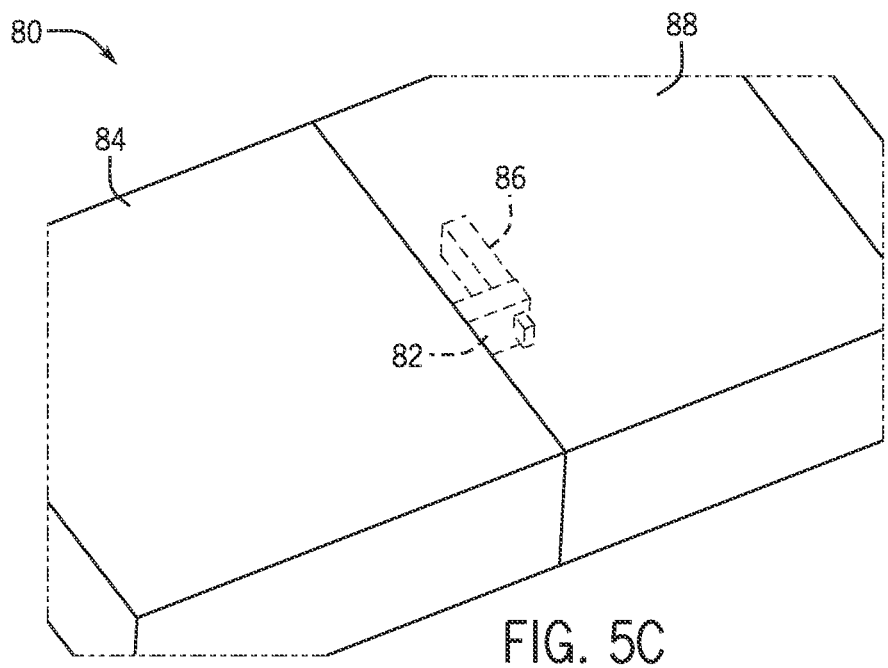

In an alternate embodiment, FIGS. 5B-5C illustrate an interlock system including a bolt lock 80. As depicted in FIG. 5B, a locking member 82 may be installed on a first ride vehicle module 84 and a bolt 86 may be installed internally on a second ride vehicle module 88. When triggered or directed to connect to the second ride vehicle module 88 by the ride vehicle circuitry 50, the lock member 82 may be guided through an opening 90 in the second ride vehicle module 88. Thereafter, the bolt 86 may be inserted through the lock to close and hold the ride vehicle modules 84 and 88 in place, as shown in FIG. 5C. The bolt 86 may be removed from the locking member 82 when directed to delink from a connected ride vehicle module and the locking member 82 may be retracted from the second ride vehicle module 88 by the first ride vehicle module 84 disengaging. A plurality of the bolt 86 and/or locking member 82 may be disposed along the sides, front, and back of the ride vehicle module as desired to strengthen the connection.

Figure 5D:
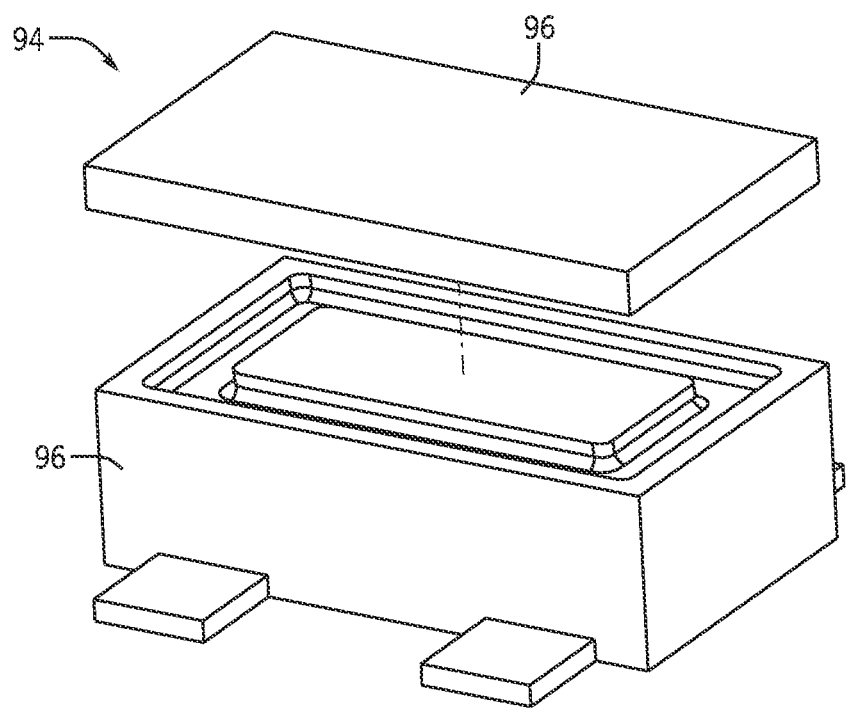
Figure 5E:
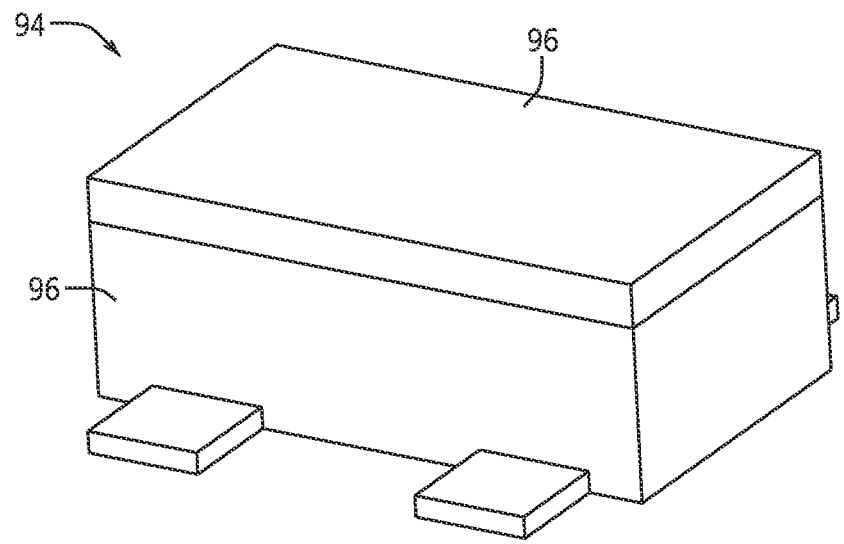

In another embodiment, FIGS. 5D-5E illustrate an interlock system including an electromagnetic lock 94 installed on the ride vehicle modules. When triggered or directed to connect to another ride vehicle module by the ride vehicle circuitry 50, the electromagnets 96 may be supplied a current to pull the desired ride vehicle modules together, as shown in FIG. 5E. When directed to delink, the supplied current to the electromagnets 96 may be turned off and the ride vehicle modules may separate and be operated independently or in unison with any remaining connected ride vehicle modules. A plurality of the electromagnets 96 may be disposed along the sides, front, and back of the ride vehicle module as desired to strengthen the connection.

Figure 5F:
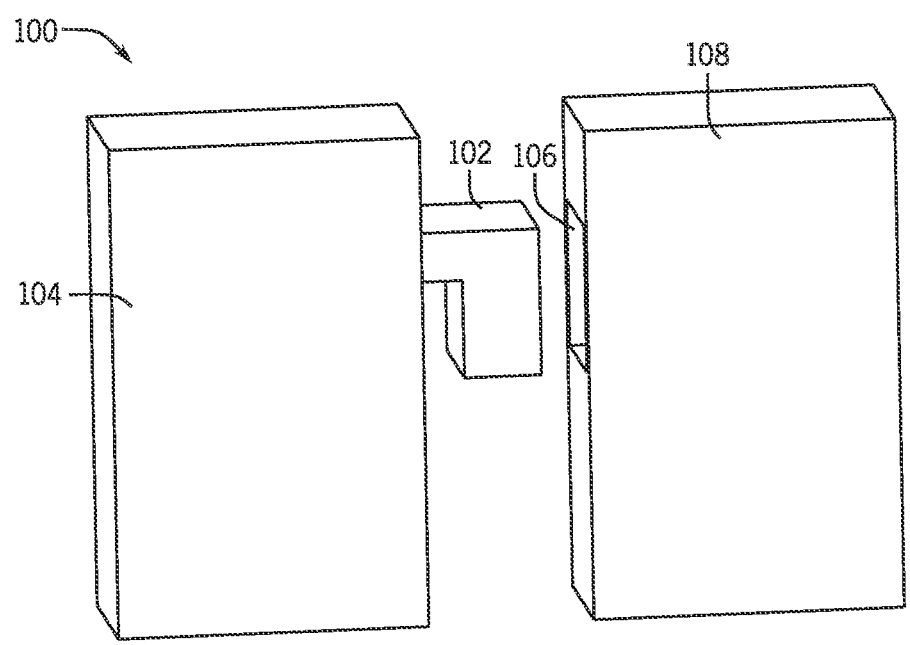
Figure 5G:
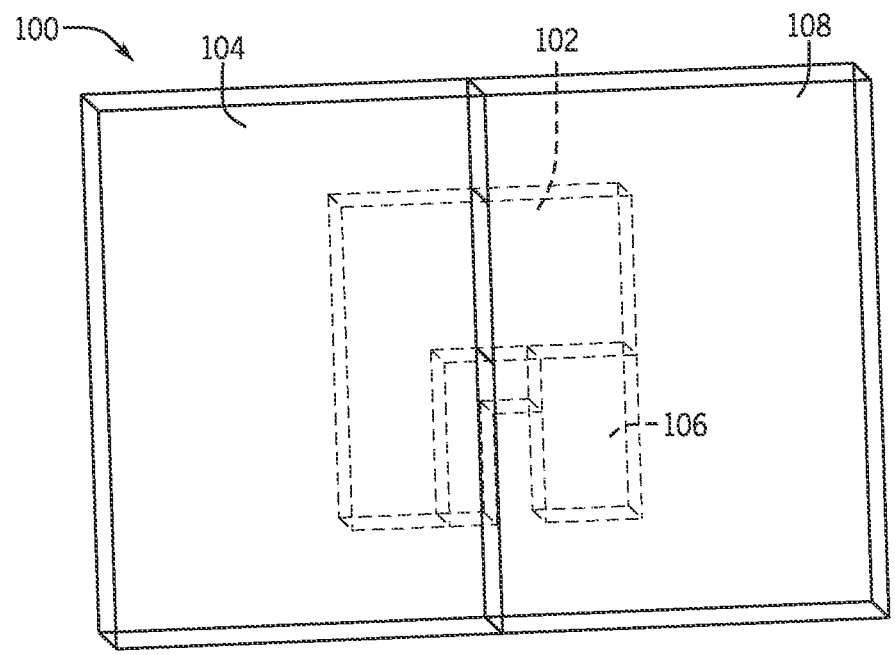

In another embodiment, FIGS. 5F-5G illustrate an interlock system including a slide lock 100. As depicted in FIG. 5F, a bolt 102 may be installed on a first vehicle module 104 and a recess 106 may be installed internally on a second ride vehicle module 108. When triggered or directed to perform linking operations by the ride vehicle circuitry 50, the bolt 102 may be inserted into and lowered down into the recess 106 of the second ride vehicle module 108 by a mechanism, as shown in FIG. 5G. When directed to delink, the mechanism may be directed to raise the bolt 102 and withdraw from the recess 106 of the second ride vehicle module 108. A plurality of the slide locks 100 may be disposed along the sides, front, and back of the ride vehicle module as desired to strengthen the connection.

Figure 5H:
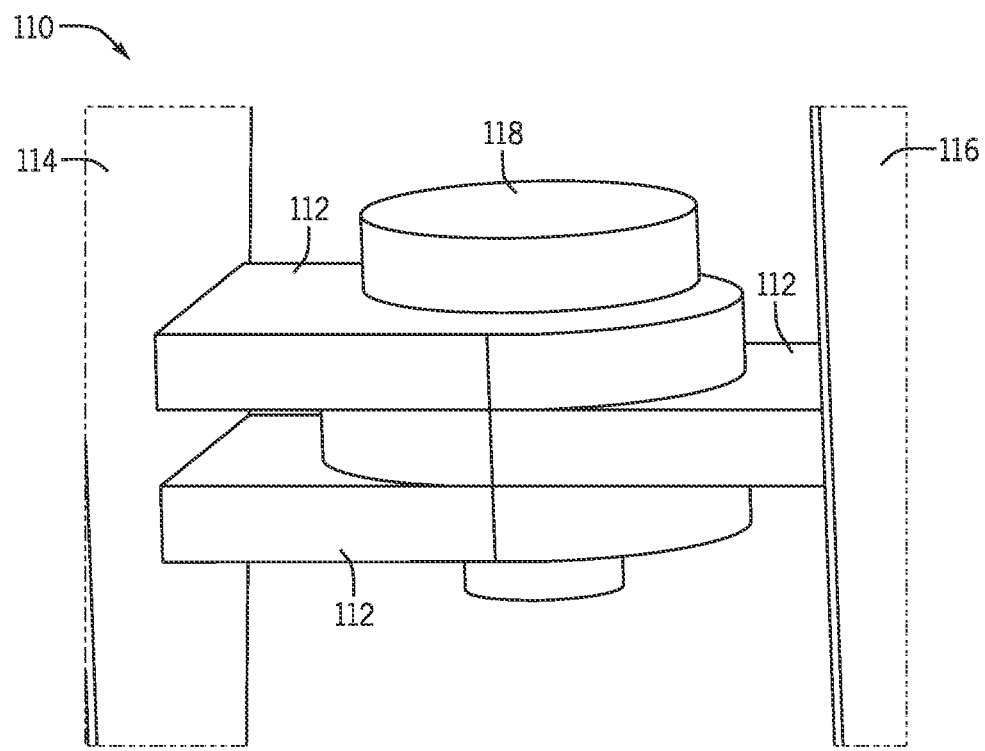

In another embodiment, FIG. 5H illustrates an interlock system including a drop pin connector lock 110. As depicted in FIG. 5H, connectors 112 may be attached to and extend from a first ride vehicle module 114 and another connector 112 may be attached to and extend from a second ride vehicle module 116. When triggered or directed to link by the ride vehicle circuitry 50, the connectors 112 of both the first and second ride vehicle modules 114 and 116 may align and a mechanism on either the first ride vehicle module 114 or second ride vehicle module 116 may insert a drop pin 118 through the connectors 112 to lock. When directed to delink, the drop pin 118 may be removed from the connectors 112 by the mechanism and the ride vehicle modules may separate, thereby disconnecting the connectors 112. A plurality of the drop pins 118 and connectors 112 may be disposed along the sides, front, and back of the ride vehicle modules as desired to strengthen the connection.

Figure 6A:
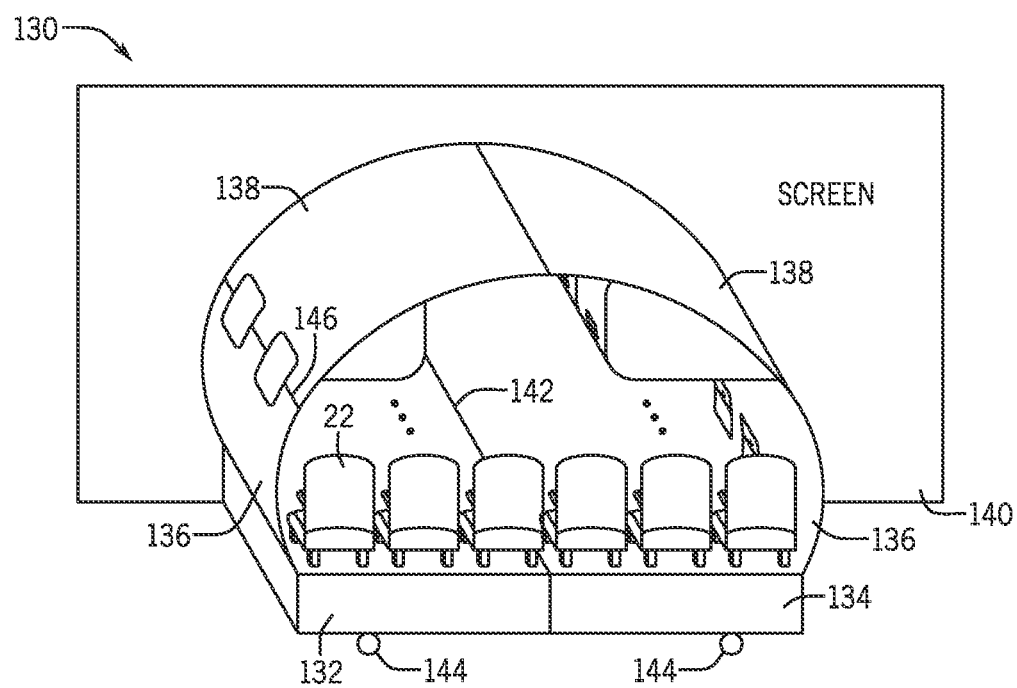
FIGS. 6A and 6B include perspective views of an embodiment of an airplane ride vehicle and its delinking features in accordance with the present disclosure.
Figure 6B:
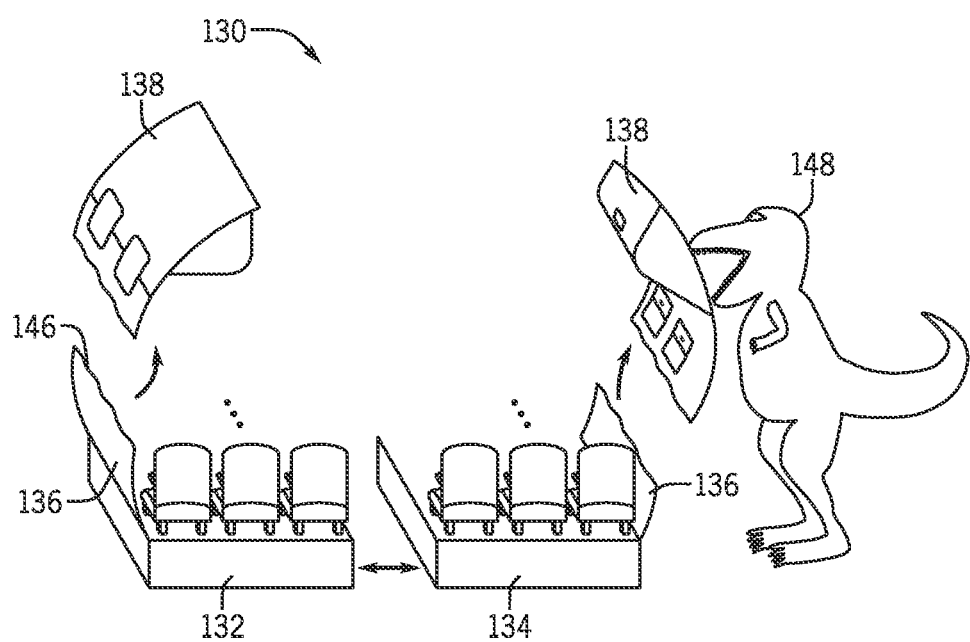

FIGS. 6A and 6B include perspective views of an embodiment of an airplane ride vehicle 130 and illustrate its delinking capability in accordance with the present disclosure. As depicted in FIG. 6A, the airplane ride vehicle 130 includes two linked ride vehicle modules 132 and 134, walls 136, and ceilings 138. Each ride vehicle module 132 and 134 may include a plurality of seats 22 arranged in various sized groups. The airplane ride vehicle 130 may be facing a display screen 140 or the display screen 140 may be attached to each ride vehicle module 132 and 134. In this embodiment, the connection line 142 splits two columns of seats 22 down the aisle between them. The techniques previously discussed regarding concealing the connection line 142 may be utilized. It should be noted that there may be any number of columns of seats 22 if other ride vehicle modules are attached side-by-side. Also, there may be other ride vehicle modules attached to the front and/or back of ride vehicle modules 132 and 134. Indeed, numerous ride vehicle modules may be linked and their connection lines may be concealed so that the ride vehicles appear to be one large airplane ride vehicle 130 that operates as a single integrated unit. For example, the front of the airplane ride vehicle 130 may pitch up and the back of the airplane ride vehicle 130 may pitch down when simulating a takeoff.

The airplane ride vehicle 130 may or may not include motion base systems attached to each modular ride vehicle. Each ride vehicle module linked together in the airplane ride vehicle 130 includes wheels 144 that enable it to drive and/or connect to roller coaster track throughout the course of the ride. Further, the walls 136 and the ceilings 138 may be joined together in a way that patrons may not realize that they break apart. For example, the connection line 146 may resemble the connection lines typically on airplanes where two exterior panels of metal are connected. That is, on the exterior, both the walls 136 and the ceilings 138 may contain bolts or fasteners near the connection line 146 to resemble a real airplane. Then, on the interior, the connection line 146 may appear as an indentation where two wall panels come together. Similar techniques described above with regards to the platform surface connection line camouflaging may be utilized, such as shadowing, patterns, and so forth. As a result, upon entering the ride vehicle in its fully clustered configuration, patrons may be under the illusion that the walls and the ceilings are going to remain intact as a unit throughout the ride experience.

FIG. 6B describes the airplane ride vehicle's capabilities to delink the ride vehicle modules 132 and 134. Further, the depicted embodiment illustrates the ride vehicle modules' ceilings 138 being detachable and/or removable. As previously described, the ride vehicle circuitry included in each of the ride vehicle modules may execute instructions to physically disconnect (e.g., delink) from another ride vehicle module. This may be triggered by a certain event that occurs during a ride. For example, the airplane ride vehicle 130 may crash into a mountain or enter a massive storm that causes it to break apart, among other things. The airplane ride vehicle 130 may then split anywhere that the ride vehicle modules are connected as desired (e.g., side-to-side, front-to-back).

The illustration shows the airplane ride vehicle 130 splitting down the middle vertically, but it should be understood that the techniques disclosed herein enable the airplane ride vehicle 130 to break apart in any number of ways (e.g., through the middle, horizontally). Each ride vehicle module 132 and 134 may operate independently after it is delinked from the other ride vehicle module. This may allow each ride vehicle module 132 and 134 to travel down separate paths in the ride. For example, the ride vehicle module 132 may fall down the mountain that the airplane crashes into by attaching to a roller coaster and descending, while the other ride vehicle module 134 may land in a forest. The ride vehicle module 134 may further encounter an animatronic dinosaur 148 that rips off the ceiling 138. The jagged line 146 represents the connection line between the ceilings 138 and the walls 136 where the two may disconnect. It should also be noted that the walls may break away as well, by retracting underneath the ride vehicles, being physically removed, or the like. Also, both ride vehicle modules 132 and 134 may be moved onto and off of motion base systems and/or positioned in simulators throughout the ride. In this way, each ride vehicle module 132 and 134 may experience different simulations and/or movements that provide different experiences in the same ride.

Additionally, FIGS. 7A and 7B include perspective views of an embodiment of a movie theater ride vehicle 150 and illustrate its delinking capability in accordance with the present disclosure. As depicted in FIG. 7A, the movie theater ride vehicle 150 includes four linked ride vehicle modules 152, 154, 156, and 158 linked at connection lines 160. The movie theater ride vehicle 150 may include walls and ceilings (represented by dashed lines 162) and a plurality of entrance ways 164 and exit ways 166. However, in some embodiments, the walls and ceiling 162 may not be connected to the ride vehicle modules 152, 154, 156, and 158. Each ride vehicle module 152, 154, 156, and 158 may include a plurality of seats 22 arranged in various sized groups. The movie theater ride vehicle 150 may be facing a video display screen 140. Alternatively, each ride vehicle module 152, 154, 156, and 158 may include onboard simulators (not shown) including audio and video display screens 140. In some embodiments, the ride vehicle modules may utilize the techniques previously discussed regarding hiding the platform 46 surface connection lines 160. As depicted, the connection lines 160 are not visible on the surface of the ride vehicle modules' platforms 46. As a result, patrons may perceive the room as a regular movie theater. That is, the patrons may not even realize that they have entered a ride at all. Instead, patrons may be under the impression that they are in some sort of movie simulator that does not move or break apart.

It should be noted that there may be any number of ride vehicle modules attached side-to-side and/or front-to-back, and they may contain any number of seats 22 as desired. Indeed, numerous ride vehicle modules may be linked and their connection lines may be concealed so that the ride vehicle modules appear to be one large movie theater. Further, the linked ride vehicle modules' circuitry 50 may enable synchronized operation as a single integrated movie theater ride vehicle 150. For example, the front of the move theater ride vehicle 150 may pitch up and the back of the movie theater ride vehicle 150 may simultaneously pitch down repeatedly when simulating an earthquake, tremor, or the like.

The movie theater ride vehicle 150 may or may not include motion base systems 44 attached to each ride vehicle module 152, 154, 156, and 158. However, in the depicted embodiment, the movie theater ride vehicle 150 does include motion base systems 44 attached to each ride vehicle module 152, 154, 156, and 158. The motion base systems 44 may include the traction system (e.g., wheels) 48 that enable driving and/or connecting to roller coaster tracks throughout the course of the ride. Further, the walls and ceiling 162 may be joined together in a way that patrons may not realize that they break apart. For example, the connection lines may resemble the connection lines typically seen in connected walls and ceiling in a room. Alternatively, curtains typically utilized in movie theater rooms may cover the connection lines. Similar techniques described above with regards to the platform 46 surface connection line camouflaging may be utilized, such as shadowing, patterns, and so forth to disguise the connection lines between the walls and the ceiling. As a result, patrons entering the fully cluster of vehicle modules may be under the illusion that the walls and the ceilings are going to remain intact as a unit throughout the experience.

FIG. 7B illustrates the movie theater ride vehicle's capability to delink the ride vehicle modules 152, 154, 156, and 158. Further, the ride vehicle modules' walls and/or ceiling 162 previously shown may be detachable and/or removable. In some embodiments, the walls and/or ceiling 162 may be removed by a robot, mechanical arm, or the like. Alternatively, the walls may retract underneath the ride vehicle modules or the walls may not be connected to the ride vehicle modules at all. As previously described, the ride vehicle circuitry 50 included in each of the ride vehicle modules may execute instructions to physically disconnect (e.g., perform delinking operations) from a connected ride vehicle module. This may be triggered by a certain event that occurs during a simulation in a ride. For example, the movie theater ride vehicle 150 may simulate a natural disaster that may affect normal movie theaters, such as an earthquake, tremor or the like, or the video display screen 140 may be showing a meteor shower in a three-dimensional simulation and a stray meteorite could "crash" into the screen 140. In any scenario, the movie theater ride vehicle 150 may then split anywhere that the ride vehicle modules 152, 154, 156, and 158 are connected as desired (e.g., side-to-side, front-to-back, along a diagonal, along a curve, along multiple interfaces).

The illustration shows the movie theater ride vehicle 150 splitting side-to-side and front-to-back, thereby freeing all ride vehicle modules 152, 154, 156, and 158. Each ride vehicle module may operate independently after it is delinked from the other ride vehicle modules. This may allow each ride vehicle module to travel down separate paths in the ride. More specifically, each ride vehicle modules' circuitry 50 may independently control their own motion base system 44 to move (e.g., drive) the ride vehicle modules in desired directions. Further, the motion base system 44 may be synchronized with an onboard simulator (not shown) to roll, pitch, yaw, surge, heave, and/or sway (e.g., six degrees of freedom motion). For example, the ride vehicle modules 152, 154, 156, and 158 may all travel down different paths, and one ride vehicle module may speed off through simulated streets in a downtown city trying to escape an earthquake while another ride vehicle attaches to a roller coaster and flies away from a simulated tornado, alien spacecraft, dinosaur, or the like, in an airplane. All the while, the motion base systems 44 vibrate and modulate in sync with the events occurring in the onboard simulator. In this way, each ride vehicle module 152, 154, 156, and 158 may experience different simulations and/or movements that provide different experiences in the same ride.

Figure 8A:
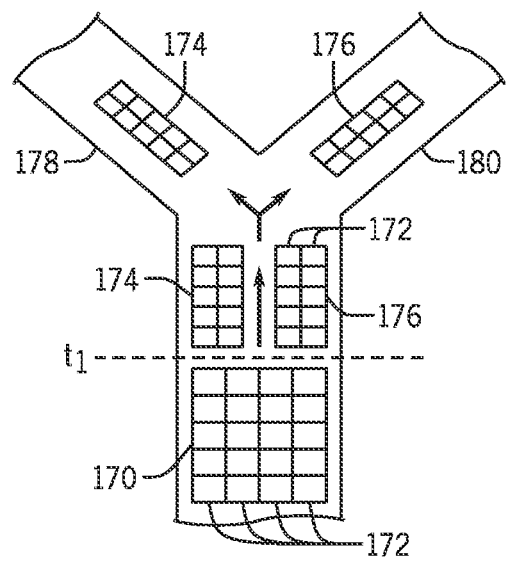
FIGS. 8A-8C include a set of top views of embodiments of ride vehicle modules configuring cluster size by performing linking and delinking operations during the course of a ride, in accordance with the present disclosure.
Figure 8B:
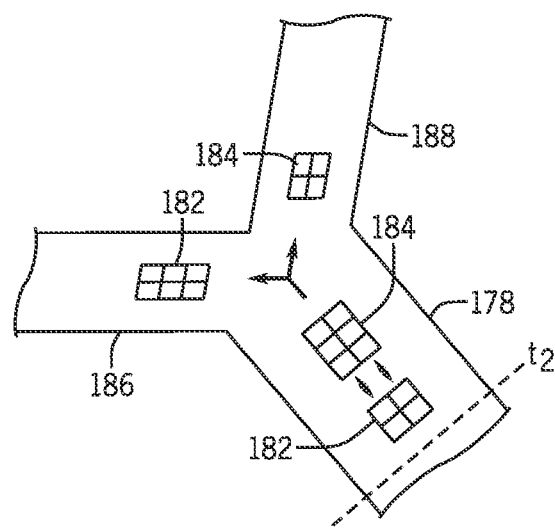
Figure 8C:
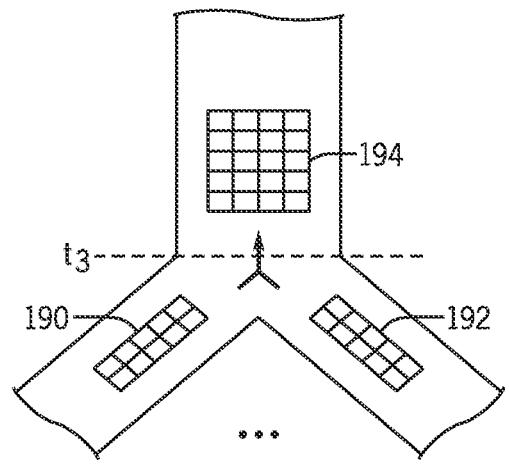

To help illustrate the different paths that the ride vehicle modules may traverse, FIGS. 8A-8C include a set of top views of ride vehicle modules configuring cluster size by performing linking operations during the course of a ride. It should be noted that each ride vehicle module may include one or more seats. Further, the connection lines between each ride vehicle module may not be visible on the surface of the platforms of the ride vehicle modules to the patrons due to the techniques described above being utilized. FIG. 8A illustrates a uniform ride vehicle 170 at the beginning of a ride. For example, uniform ride vehicle 170 may be the airplane ride vehicle or movie theater ride vehicle previously discussed, or it may be any other uniform ride vehicle 170 that includes one or more linked ride vehicle modules 172. At an initial time (t1), some event triggers the uniform ride vehicle 170 to perform delinking operations and separate into two different intermediate uniform ride vehicles 174 and 176 including one or more ride vehicle modules 172. Utilizing ride vehicle circuitry 50, the intermediate uniform ride vehicles 174 and 176 may operate as integrated units and be driven or moved down separate paths. As may be seen, the intermediate uniform ride vehicle 174 may travel down path 178 and the intermediate uniform ride vehicle 176 may travel down path 180.

As previously discussed, both paths 178 and 180 may include different stories, simulations, and movements. Indeed, either or both paths may include rollercoaster tracks that the intermediate uniform ride vehicles 174 and/or 176 may connect to, water chutes and/or water bodies that the intermediate uniform ride vehicles 174 and/or 176 may float through, pavement that the intermediate uniform ride vehicles 174 and/or 176 may drive on, and so forth. Likewise, the audio and visual elements that the intermediate uniform ride vehicles 174 and 176 experience may be different, as well.

Further, FIG. 8B describes a top view further down path 178 where, at a second time (t2), another event may cause the intermediate uniform ride vehicle 174 to delink and break apart into two different intermediate uniform ride vehicles 182 and 184. Each intermediate uniform ride vehicle 182 and 184 may subsequently travel down different paths. For example, the intermediate uniform ride vehicle 182 may travel down path 186 and the intermediate uniform ride vehicle 184 may travel down path 188. Here, again, each intermediate uniform ride vehicle 182 and 184 may experience different stories, simulations, and/or movements. As may be appreciated, the intermediate uniform ride vehicles may continue to break apart until only a single ride vehicle module remains. Each time the intermediate uniform ride vehicle splits apart the resulting ride vehicle (e.g., single ride vehicle module or subset of modules) may obtain different experiences. This may encourage re-riding the attraction multiple times to experience all the different paths.

At some point in the ride, it may be desirable to re-link the ride vehicle modules. Thus, FIG. 8C describes two intermediate uniform ride vehicles 190 and 192 performing linking operations at a third time (t3) to reconnect. Time t3 may be in response to some event that occurs during the ride that may be part of the story in a simulation. For example, in a ride where the patrons and ride vehicles are blood cells in the human body traveling through veins, the blood cells may reunite when coming to an artery, or the like. Or, in a ride where the patrons and ride vehicles are fighter jets, the fighter jets may return to the aircraft carrier at the end of a mission. Thus, the intermediate uniform ride vehicles 190 and 192 may re-link to provide the requisite impression as uniform ride vehicle 194. At this point, the ride may terminate and the patrons may exit the uniform ride vehicle 194.

In other embodiments, the separated ride vehicle clusters may unload the patrons separately in different exit bays and the ride vehicles may not reunite for the next ride cycle until after the patrons have exited. Further, there may be other points throughout the ride where the ride vehicle clusters perform linking operations to change the size of the cluster that they are traveling in. In any embodiment, it should be understood that the ride vehicle modules are enabled to increase and decrease the size of the cluster that they are traveling throughout the course of a ride. As a result, a patron may ride the attraction several times and experience something new depending on which uniform ride vehicle, cluster, or ride vehicle module they are seated in.

Figure 9:
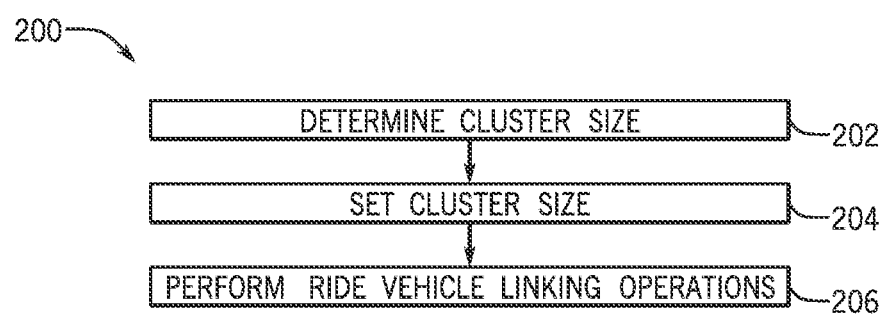
FIG. 9 is a process for configuring a cluster size of a ride vehicle during a ride, in accordance with the present disclosure.

In addition, a block diagram of a process 200 for operating the ride vehicle modules is depicted in FIG. 9. The process 200 may include determining the cluster size (process block 202), setting the cluster size (process block 204), and performing ride vehicle linking operations (process block 206). More specifically, determining the cluster size (process block 202) may be performed by the ride vehicles' circuitry 50 (e.g., processors) of a plurality of ride vehicle modules communicating with one another throughout a ride. For example, at a certain time in the ride, an event may occur in a simulation or as part of the course that triggers a uniform ride vehicle or cluster to break apart, and the ride vehicles' circuitry 50 may determine how many ride vehicle modules to include in the broken up cluster(s). The size of the clusters may be stored in a tangible, non-transitory media (e.g. memory) that is associated with the specific time/event in the course of the ride that may be accessed by the ride vehicle circuitry 50. As a result, the ride vehicles' circuitry 50 may set the cluster size (process block 204) accordingly. Then, the ride vehicle modules that need to delink and break apart may perform delinking operations to separate into the determined cluster sizes (process block 206).

Likewise, the process 200 may be utilized when the cluster size needs to increase. For example, at a certain time in the ride, an event may occur that triggers one or more clusters (e.g., intermediate uniform ride vehicles) to perform linking operations to reconnect. The ride vehicles' circuitry 50 may determine the size of the cluster(s) (process block 202), which may include determining how many ride vehicle modules to link together utilizing the techniques described herein. Then, in process block 204, the ride vehicles' circuitry 50 sets the cluster size and, in process block 206, the ride vehicle modules perform linking operations accordingly in order to achieve the desired sized cluster(s).

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
  a plurality of ride vehicles, wherein each ride vehicle of the plurality of ride vehicles is configured to carry one or more passengers along a trackless ride path during a ride cycle; and
  control circuitry configured to:
    control a first cluster of ride vehicles and a second cluster of ride vehicles to travel together as a respective unit over a first portion of the trackless ride path during a first portion of the ride cycle to provide a visual effect of the first cluster of ride vehicles being operated in a coordinated manner with the second cluster of ride vehicles during the first portion of the ride cycle, wherein the first cluster of ride vehicles comprises a first two or more ride vehicles of the plurality of ride vehicles, and wherein the second cluster of ride vehicles comprises a second two or more ride vehicles of the plurality of ride vehicles; and
    control the first two or more ride vehicles of the first cluster of ride vehicles to travel together as a respective unit over a second portion of the trackless ride path during a second portion of the ride cycle and the second two or more ride vehicles of the second cluster of ride vehicles to travel together as a respective unit over a third portion of the trackless ride path during the second portion of the ride cycle to provide an additional visual effect of the first cluster of ride vehicles being operated independently of the second cluster of ride vehicles during the second portion of the ride cycle.

2. The system of claim 1, comprising a third cluster of ride vehicles configured to carry one or more additional passengers during the ride cycle, wherein the third cluster of ride vehicles comprises a third two or more ride vehicles of the plurality of ride vehicles, wherein the control circuitry is configured to:
  control the first cluster of ride vehicles, the second cluster of ride vehicles, and the third cluster of ride vehicles to travel together as a respective unit over the first portion of the trackless ride path during the first portion of the ride cycle to provide the visual effect of the first cluster of ride vehicles being operated in the coordinated manner with the second cluster of ride vehicles and the third cluster of ride vehicles during the first portion of the ride cycle; and
  control the first two or more ride vehicles of the first cluster of ride vehicles to travel together as the respective unit over the second portion of the trackless ride path during the second portion of the ride cycle, the second two or more ride vehicles of the second cluster of ride vehicles to travel together as the respective unit over the third portion of the trackless ride path during the second portion of the ride cycle, and the third two or more ride vehicles of the third cluster of ride vehicles to travel together as a respective unit over a fourth portion of the trackless ride path during the second portion of the ride cycle to provide the additional visual effect of the first cluster of ride vehicles being operated independently of the second cluster of ride vehicles and the third cluster of ride vehicles during the second portion of the ride cycle.

3. The system of claim 1, wherein the control circuitry is configured to:
  control the first cluster of ride vehicles and the second cluster of ride vehicles to travel together as the respective unit over the first portion of the trackless ride path during the first portion of the ride cycle to provide the visual effect of the first cluster of ride vehicles being operated in the coordinated manner with the second cluster of ride vehicles as a unified ride vehicle during the first portion of the ride cycle; and
  control the first two or more ride vehicles of the first cluster of ride vehicles to travel together as the respective unit over the second portion of the trackless ride path during the second portion of the ride cycle and the second two or more ride vehicles of the second cluster of ride vehicles to travel together as the respective unit over the third portion of the trackless ride path during the second portion of the ride cycle to provide the additional visual effect of the first cluster of ride vehicles being operated independently of the second cluster of ride vehicles as separate portions of the unified ride vehicle during the second portion of the ride cycle.

4. The system of claim 1, wherein the control circuitry is configured to:
  control the first cluster of ride vehicles and the second cluster of ride vehicles to provide a further visual effect of the first cluster of the ride vehicles transitioning from being operated in the coordinated manner with the second cluster of ride vehicles to being operated independently of the second cluster of ride vehicles in coordination with a simulated event during the ride cycle, a storyline during the ride cycle, or both.

5. The system of claim 1, wherein the control circuitry is configured to:
control the first cluster of ride vehicles and the second cluster of ride vehicles to travel together as the respective unit over the first portion of the trackless ride path during the first portion of the ride cycle to provide a further visual effect of the first cluster of ride vehicles being physically linked to the second cluster of ride vehicles during the first portion of the ride cycle.

6. The system of claim 1, wherein the control circuitry is configured to:
control the first two or more ride vehicles of the first cluster of ride vehicles to move in a different direction than the second two or more ride vehicles of the second cluster of ride vehicles to provide the additional visual effect of the first cluster of ride vehicles being operated independently of the second cluster of ride vehicles.

7. The system of claim 6, wherein the control circuitry is configured to:
control the first two or more ride vehicles of the first cluster of ride vehicles to move in the different direction than the second two or more ride vehicles of the second cluster of ride vehicles in coordination with a change in terrain during the ride cycle, and the change in the terrain comprises a split in a path being traveled by the first cluster of ride vehicles and the second cluster of ride vehicles such that the first cluster of ride vehicles is directed in a first direction along a first path portion after the split and the second cluster of ride vehicles is directed in a second direction along a second path portion after the split.

8. The system of claim 1, wherein the first portion of the ride cycle comprises a beginning portion of the ride cycle after the first cluster of ride vehicles and the second cluster of ride vehicles depart from a passenger loading zone, and the second portion of the ride cycle comprises an intermediate portion of the ride cycle after the beginning portion of the ride cycle and before an end portion of the ride cycle.

9. The system of claim 8, wherein the control circuitry is configured to:
control the first cluster of ride vehicles and the second cluster of ride vehicles to travel together as the respective unit during a third portion of the ride cycle to provide the visual effect of the first cluster of ride vehicles being operated in the coordinated manner with the second cluster of ride vehicles during the third portion of the ride cycle after the second portion of the ride cycle.

10. The system of claim 1, wherein the control circuitry comprises a plurality of processors and a plurality of communication devices, each ride vehicle of the plurality of ride vehicles comprises a respective processor of the plurality of processors and a respective communication device of the plurality of communication devices, and the plurality of processors and the plurality of communication devices are configured to operate to coordinate movement of the plurality of ride vehicles.

11. The system of claim 1, wherein the control circuitry is configured to control the first cluster of ride vehicles to link to the second cluster of ride vehicles by physical engagement during the first portion of the ride cycle.

12. The system of claim 1, wherein the control circuitry is configured to control a first respective ride vehicle and a second respective ride vehicle of the first two or more ride vehicles of the plurality of ride vehicles that form the first cluster of ride vehicles to provide a further visual effect of the first respective ride vehicle being operated independently of the second respective ride vehicle during a third portion of the ride cycle.

13. A system, comprising:
a plurality of ride vehicles configured to carry a plurality of passengers through a ride cycle; and
a control circuitry configured to:
control the plurality of ride vehicles to move together as a cluster over a first portion of a ride path during a first portion of the ride cycle;
control two or more ride vehicles of the plurality of ride vehicles to move together as an intermediate cluster away from a remainder of the plurality of ride vehicles over a second portion of the ride path during a second portion of the ride cycle; and
control the two or more ride vehicles of the plurality of ride vehicles to move together as the intermediate cluster and separately from the remainder of the plurality of ride vehicles over a third portion of the ride path during a third portion of the ride cycle.

14. The system of claim 13, wherein the control circuitry is configured to control at least two respective ride vehicles of the remainder of the plurality of ride vehicles to move together as an additional intermediate cluster during the third portion of the ride cycle.

15. The system of claim 13, wherein the control circuitry is configured to:
control the remainder of the plurality of ride vehicles to move over a fourth portion of the ride path during the third portion of the ride cycle.

16. The system of claim 13, wherein the control circuitry comprises a plurality of processors and a plurality of communication devices, each ride vehicle of the plurality of ride vehicles comprises a respective processor of the plurality of processors and a respective communication device of the plurality of communication devices, and the plurality of processors and the plurality of communication devices are configured to operate to coordinate movement of the plurality of ride vehicles.

17. The system of claim 13, wherein the control circuitry is configured to:
control the two or more ride vehicles of the plurality of ride vehicles to move together as the intermediate cluster away from the remainder of the plurality of ride vehicles in coordination with a simulated event during the ride cycle.

18. A system, comprising:
a plurality of ride vehicles; and
control circuitry comprising a plurality of processors and a plurality of communication devices, wherein each ride vehicle of the plurality of ride vehicles comprises a respective processor of the plurality of processors and a respective communication device of the plurality of communication devices, wherein the plurality of communication devices are configured to operate to communicate data between the plurality of ride vehicles to enable the plurality of processors to control the plurality of ride vehicles in a coordinated manner to adjust a number of ride vehicles of the plurality of ride vehicles that move together as a cluster during a ride cycle;
wherein, to adjust the number of ride vehicles of the plurality of ride vehicles that move together as the cluster during the ride cycle, the control circuitry is configured to:
control two or more ride vehicles of the plurality of ride vehicles and at least one additional ride vehicle of the plurality of ride vehicles to move together as the cluster over a first portion of a ride path during a first portion of the ride cycle; and control the two or more ride vehicles of the plurality of ride vehicles to move together as an intermediate cluster away from the at least one additional ride vehicle of the plurality of ride vehicles over a second portion of the ride path during a second portion of the ride cycle.

19. The system of claim 18, wherein the plurality of communication devices are configured to wirelessly communicate with one another.

20. The system of claim 18, wherein the control circuitry is configured to:

control the two or more ride vehicles of the plurality of ride vehicles to link to the at least one additional ride vehicle of the plurality of ride vehicles by physical engagement during the first portion of the ride cycle.

21. The system of claim 18, wherein the control circuitry is configured to:

control the two or more ride vehicles of the plurality of ride vehicles to move together as the intermediate cluster away from the at least one additional ride vehicle of the plurality of ride vehicles in coordination with a simulated event during the ride cycle.

22. The system of claim 18, wherein the control circuitry is configured to:

control the two or more ride vehicles of the plurality of ride vehicles to move together as the intermediate cluster and separately from the at least one additional ride vehicle of the plurality of ride vehicles over a third portion of the ride path during a third portion of the ride cycle; and control the at least one additional ride vehicle of the plurality of ride vehicles to move over a fourth portion of the ride path during the third portion of the ride cycle.

* * * * *